(12) United States Patent
Ma et al.

(10) Patent No.: US 11,368,264 B2
(45) Date of Patent: *Jun. 21, 2022

(54) DATA PROCESSING METHOD AND DATA PROCESSING APPARATUS

(71) Applicant: HUAWEI TECHNOLOGIES CO., LTD., Shenzhen (CN)

(72) Inventors: Liang Ma, Shanghai (CN); Chen Zheng, Shanghai (CN); Xin Zeng, Shenzhen (CN); Yuejun Wei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,175

(22) Filed: May 12, 2020

(65) Prior Publication Data

US 2020/0274663 A1 Aug. 27, 2020

Related U.S. Application Data

(63) Continuation of application No. 16/231,946, filed on Dec. 25, 2018, now Pat. No. 10,693,609, which is a (Continued)

(30) Foreign Application Priority Data

Apr. 28, 2017 (CN) .......................... 201710295902.6

(51) Int. Cl.
   *G06F 15/16* (2006.01)
   *H04L 5/00* (2006.01)
   *H04L 1/18* (2006.01)

(52) U.S. Cl.
   CPC .............. *H04L 5/0046* (2013.01); *H04L 1/18* (2013.01)

(58) Field of Classification Search
   CPC ................................ H04L 5/0046; H04L 1/18
   (Continued)

(56) References Cited

U.S. PATENT DOCUMENTS

| 4,745,599 A | 5/1988 | Raychaudhuri |
| 5,444,718 A | 8/1995 | Ejzak et al. |

(Continued)

FOREIGN PATENT DOCUMENTS

| CN | 1983913 A | 6/2007 |
| CN | 101282192 A | 10/2008 |

(Continued)

OTHER PUBLICATIONS

Samsung, "Overview of CBG-based retransmission in NR," 3GPP TSG RAN WG1 Meeting #88bis, Spokane, USA, R1-1705401, total 4 pages, 3rd Generation Partnership Project, Valbonne, France (Apr. 3-7, 2017).

(Continued)

*Primary Examiner* — Imad Hussain
(74) *Attorney, Agent, or Firm* — Leydig, Voit & Mayer, Ltd.

(57) ABSTRACT

Embodiments of this application relate to communication technologies and provide a method for transmitting or retransmitting data in a transport block. The transport block includes one or more code block groups, and each code block group includes one or more code blocks. A data processing device determines a code block group in the transport block that needs to be transmitted. Each code block in the code block group is processed by the data processing device to obtain a bit sequence. The data processing device transmits one or more bit sequences obtained by processing one or more code blocks in the code block group. The method and the apparatus provided in this application help reduce waste of air interface resources.

20 Claims, 2 Drawing Sheets

Related U.S. Application Data continuation of application No. PCT/CN2018/085126, filed on Apr. 28, 2018.

(58) Field of Classification Search
USPC .......................................................... 709/217
See application file for complete search history.

(56) References Cited

U.S. PATENT DOCUMENTS

| | | | |
|---|---|---|---|
| 6,778,501 | B1 | 8/2004 | Malmgren et al. |
| 10,693,609 | B2* | 6/2020 | Ma .................. H04L 1/0025 |
| 2002/0064167 | A1 | 5/2002 | Khan et al. |
| 2003/0147454 | A1 | 8/2003 | Kwon et al. |
| 2006/0107166 | A1* | 5/2006 | Nanda ................ H04L 1/1664 |
| | | | 714/748 |
| 2006/0291468 | A1 | 12/2006 | Bopardikar et al. |
| 2007/0223527 | A1 | 9/2007 | Shao et al. |
| 2007/0234134 | A1 | 10/2007 | Shao et al. |
| 2009/0238066 | A1 | 9/2009 | Cheng et al. |
| 2010/0215020 | A1 | 8/2010 | Lee et al. |
| 2012/0002657 | A1 | 1/2012 | Seyama et al. |
| 2012/0087424 | A1 | 4/2012 | Brown et al. |
| 2012/0110406 | A1 | 5/2012 | Sun et al. |
| 2013/0013970 | A1* | 1/2013 | Tao .................. H04L 1/1835 |
| | | | 714/E11.112 |
| 2016/0269294 | A1 | 9/2016 | Rankin |
| 2017/0294990 | A1 | 10/2017 | Ku et al. |
| 2018/0004705 | A1 | 1/2018 | Menachem et al. |
| 2018/0227085 | A1 | 8/2018 | Chen et al. |
| 2018/0270022 | A1* | 9/2018 | Sun .................. H04L 1/1896 |
| 2018/0279167 | A1 | 9/2018 | Li et al. |
| 2019/0020444 | A1 | 1/2019 | Olsson et al. |
| 2019/0089494 | A1 | 3/2019 | Park et al. |
| 2019/0356430 | A1* | 11/2019 | Cheng .................. H04L 1/1614 |
| 2020/0170033 | A1* | 5/2020 | Gao .................. H04W 72/1289 |
| 2021/0120537 | A1* | 4/2021 | Lei .................... H04L 5/0053 |

FOREIGN PATENT DOCUMENTS

| | | |
|---|---|---|
| CN | 101615986 A | 12/2009 |
| CN | 101662346 A | 3/2010 |
| CN | 101765194 A | 6/2010 |
| CN | 102255712 A | 11/2011 |
| CN | 102377529 A | 3/2012 |
| CN | 103281167 A | 9/2013 |
| CN | 103981167 A | 9/2013 |
| CN | 105306166 A | 2/2016 |
| CN | 105515719 A | 4/2016 |
| CN | 105530071 A | 4/2016 |
| CN | 106385309 A | 2/2017 |
| JP | 2006019782 A | 1/2006 |
| JP | 2009296137 A | 12/2009 |
| JP | 2016010152 A | 1/2016 |
| WO | 2008105162 A1 | 9/2008 |
| WO | 2010109521 A1 | 9/2010 |
| WO | 2010115295 A1 | 10/2010 |
| WO | 2015184919 A1 | 12/2015 |
| WO | 2016045391 A1 | 3/2016 |

OTHER PUBLICATIONS

"NR HARQ timing and feedback schemes," 3GPP TSG HAN WG1 Meeting #88, Athens, Greece, R1-1701593, pp. 1-8, 3rd Generation Partnership Project, Valbonne, France (Feb. 13-17, 2017).

"Views on HARQ enhancements for NR," 3GPP TSG RAN WG1 Meeting #88, Athens, Greece, R1-1702815, pp. 1-4, 3rd Generation Partnership Project, Valbonne, France (Feb. 13-17, 2017).

"CB-group based retransmission for eMBB",3GPP TSG HAN WG1 Meeting #88, Athens, Greece, R1-1702990, pp.1-10, 3rd Generation Partnership Project, Valbonne, France (Feb. 13-17, 2017).

"Discussion on CB group based HARQ operation," 3GPP TSG HAN WG1 Meeting #88bis, Spokane, USA, R1-1704916, pp. 1-4, 3rd Generation Partnership Project, Valbonne, France (Apr. 3-7, 2017).

"3rd Generation Partnership Project; Technical Specification Group Radio Access Network; Evolved Universal Terrestrial Radio Access (E-UTRA); Multiplexing and channel coding (Release 14)," 3GPP TS 36.212, V14.2.0, pp. 1-197, 3rd Generation Partnership Project, Valbonne, France {Mar. 2017).

* cited by examiner

DATA PROCESSING METHOD AND DATA PROCESSING APPARATUS

CROSS-REFERENCE TO RELATED APPLICATIONS

This application is a continuation of U.S. patent application Ser. No. 16/231,946, filed on Dec. 25, 2018, which is a continuation of International Application No. PCT/CN2018/085126, filed on Apr. 28, 2018, which claims priority to Chinese Patent Application No. 201710295902.6, filed on Apr. 28, 2017. All of the afore-mentioned patent applications are hereby incorporated by reference in their entireties.

TECHNICAL FIELD

This application relates to the communications field, and more specifically, to a data processing method and a data processing apparatus.

BACKGROUND

In an existing communications system, a device that receives data (referred to as receiving end hereinafter) performs check on received data, and feeds back a negative acknowledgement (NACK) to a device that transmits data (referred to as transmitting end hereinafter) when it finds out that an error occurred on a received code block in a transport block. After receiving the NACK feedback information, the transmitting end retransmits the entire transport block. This causes a waste of air interface resources.

SUMMARY

This application provides a data processing method and a data processing apparatus, to help save resources of the data processing apparatus.

According to an aspect, a data processing method is provided. The data processing method includes: determining a to-be-transmitted code block group in K code block groups, where the to-be-transmitted code block group includes at least one code block, and K is a positive integer; performing at least one of the following operations: encoding, rate matching, interleaving, and code block concatenation on the to-be-transmitted code block group, to obtain to-be-transmitted bits; and modulating the to-be-transmitted bits.

In the data processing method, the to-be-transmitted code block group in the K code block groups is determined before the encoding, rate matching, interleaving, or code block concatenation. So that encoding, rate matching, interleaving, or code block concatenation, or an operation after code block concatenation can be performed on only the to-be-transmitted code block group or the code block included in the to-be-transmitted code block group. The above operations are not performed on a code block group other than the to-be-transmitted code block group in the K code block groups, thereby helping save resources and improving transmission efficiency.

With reference to the first aspect, in a first possible implementation, the data processing method further includes: obtaining indication information. The indication information is used to indicate the to-be-transmitted code block group in the K code block groups. The determining a to-be-transmitted code block group in K code block groups includes: determining the to-be-transmitted code block group in the K code block groups based on the indication information.

With reference to the first aspect or the first possible implementation, in a second possible implementation, the data processing method further includes: determining a quantity K of target code block groups in a transport block; and segmenting the transport block into the K code block groups.

With reference to the second possible implementation, in a third possible implementation, the determining a quantity K of target code block groups in a transport block includes: determining K based on at least one of the following information: a length of the transport block, a maximum quantity of bits of acknowledgement information fed back by a receiving end, and a quantity of code block groups that is indicated by control signaling.

With reference to the third possible implementation, in a fourth possible implementation, K is a minimum value in the maximum quantity of bits and a quantity of code block groups configured for the transport block with the length. Or, K is a minimum value in the quantity of code block groups that is indicated by the control signaling and a quantity of code block groups configured for the transport block with the length. Or, K is a minimum value in the quantity of code block groups that is indicated by the control signaling and the maximum quantity of bits; or K is a minimum value in the maximum quantity of bits of the acknowledgement information fed back by the receiving end, a quantity of code block groups configured for the transport block with the length, and the quantity of code block groups that is indicated by the control signaling.

According to a second aspect, this application provides a data processing apparatus. The data processing apparatus includes a processing module. The processing module is configured to: determine a to-be-transmitted code block group in K code block groups, where the to-be-transmitted code block group includes at least one code block, and K is a positive integer. The processing module is further configured to perform at least one of the following operations: encoding, rate matching, interleaving, and code block concatenation on the to-be-transmitted code block group, to obtain to-be-transmitted bits. The processing module is further configured to modulate the to-be-transmitted bits.

Optionally, the processing module may be a module configured to perform the data processing method in any possible implementation of the first aspect.

According to a third aspect, this application provides a data processing apparatus. The data processing apparatus includes a processor. The processor is configured to execute code. When executing the code, the processor determines a to-be-transmitted code block group in K code block groups, where the to-be-transmitted code block group includes at least one code block, and K is a positive integer. The processor performs at least one of the following operations: encoding, rate matching, interleaving, and code block concatenation on the to-be-transmitted code block group, to obtain to-be-transmitted bits; and the processor further modulates the to-be-transmitted bits.

Optionally, the processor may implement the data processing method in any possible implementation of the first aspect.

Optionally, the data processing apparatus may further include a memory, configured to store the code executed by the processor. The data processing apparatus may further include: a receiver and a transmitter, the receiver is configured to receive information transmitted by another device, and the transmitter is configured to transmit information to another device.

According to a fourth aspect, this application provides a computer readable storage medium. The computer readable storage medium stores program code executed by a data processing apparatus, and the program code includes instructions used to perform the data processing method in any one of the first aspect and the possible implementations of the first aspect.

According to a fifth aspect, this application provides a computer program product including an instruction. When the computer program product runs on a data processing apparatus, the data processing apparatus performs the data processing method in any one of the first aspect and the possible implementations of the first aspect.

DESCRIPTION OF EMBODIMENTS

The following describes the technical solutions of this application with reference to the accompanying drawings.

Figure 1:
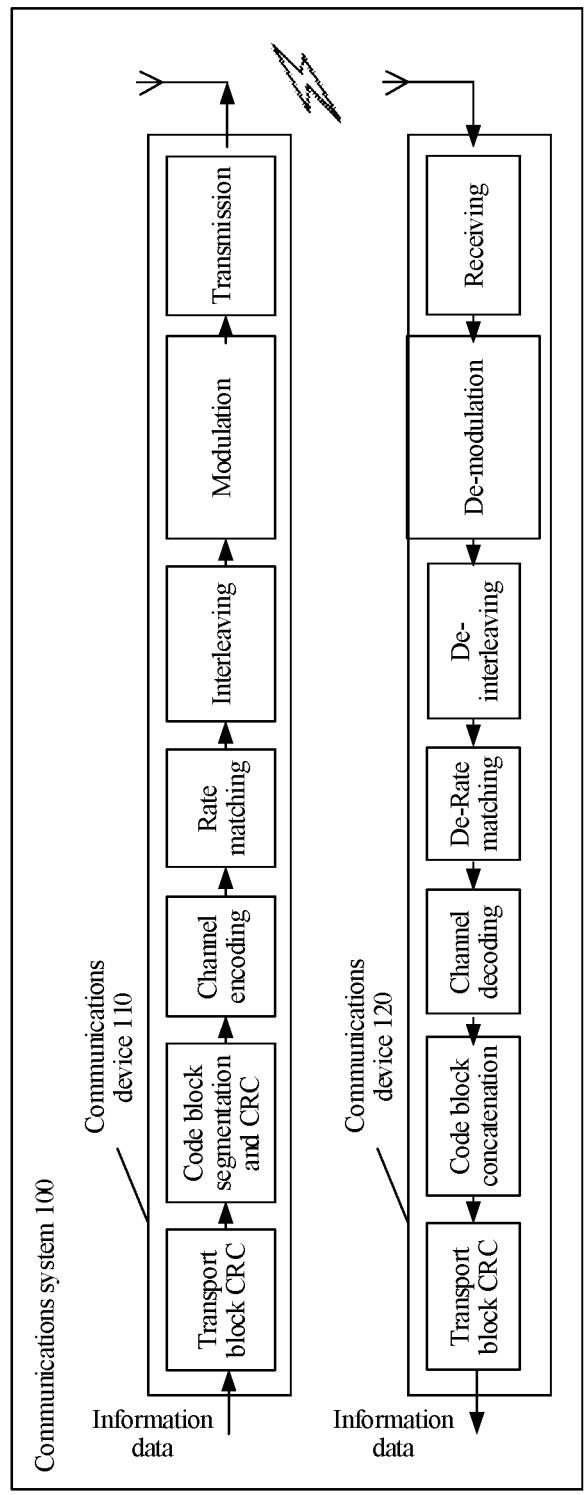
FIG. 1 is a schematic diagram of a communication system in an application scenario to which a data processing method according to an embodiment of this application can be applied.

FIG. 1 is a schematic diagram of a communication system in an application scenario according to an embodiment of this application. As shown in FIG. 1, the communication system includes communication devices 110 and 120. The communications device 110 may include a number of components or means. In particular, the communication device 110 may include a component or means configured to generate transport block cyclic redundancy check (CRC), a component or means configured to perform code block segmentation and CRC check, a component or means configured to perform channel encoding, a component or means configured to perform rate matching, a component or means configured to perform interleaving, a component or means configured to perform modulation, and a component or means configured to implement a transmitting function. Similarly, the communications device 120 may include a component or means configured to implement a receiving function, a component or means configured to perform demodulation, a component or means configured to perform de-interleaving, a component or means configured to perform de-rate matching, a component or means configured to perform channel decoding, a component or means configured to implement a code block concatenation function, and a component or means configured to perform CRC check.

It should be understood that embodiments of this application are not limited to the application scenario shown in FIG. 1. Furthermore, each component or means of the communications device 110 or the communications device 120 may be hardware, may be functional software modules, or may be a combination of the two. For example, the component or means configured to perform rate matching may also be referred to as a rate matching unit, a rate matching module, or a rate matcher. The component or means configured to perform channel encoding may also be referred to as a channel encoding unit, a channel encoding module, or a channel encoder. The component or means configured to perform interleaving may also be referred to as an interleaving unit, an interleaving module, or an interleaver. Other modules are analogized on this basis. It may be understood that functions of these means may be implemented by using one or more processors.

The communication system 100 shown in FIG. 1 includes the communications device 110 and the communications device 120. It should be understood that each of the communications device 110 and the communications device 120 may include more or fewer function modules.

When transmitting information or data, the communications device 110 may segment the information or data into a plurality of transport blocks based on a supported transport block size, and attach cyclic redundancy check (CRC) bits to each transport block. If a size of the transport block after attachment of the CRC bits exceeds a maximum code block length, the transport block needs to be segmented into several code blocks. CRC bit(s) may also be attached to each code block, and filler bit(s) may further be inserted.

The communications device 110 may segment the transport block into a plurality of code blocks, and arrange the code blocks into one or more code block groups (CBG). One CBG may include one or more code blocks. When an error occurs on a code block of a transport block, for example, the code block has not been correctly received or has a decoding error, a receiving end may feedback information of a code block group, to which the erroneous code block belongs, to a transmitting end. The transmitting end retransmits the code block group to the receiving end. This way, the transmitting end does not need to retransmit the entire transport block, thereby saving air interface resources.

The communications device 110 performs channel encoding on each code block to obtain a corresponding encoded code block. The channel encoding may use a low-density parity-check (LDPC) code, for example. Each encoded code block includes a plurality of information bits obtained before the encoding, and check bits generated through the encoding. The information bits and the check bits are collectively referred to as encoded bits.

An encoded code block is stored in a circular buffer of the communications device 110 after an optional sub-block interleaving. The communications device 110 selects a segment of the encoded bits from the circular buffer, and the segment of the encoded bits is interleaved and mapped to modulation symbols for transmission.

When performing retransmission, in a possible implementation, the communications device 110 selects another encoded bit segment of the encoded code block from the circular buffer for transmission, and if all data in the circular buffer has been transmitted, the communications device 110 returns to a beginning of the circular buffer and retransmits the encoded bits. In another possible implementation, the communications device 110 performs steps such as code block segmentation on the transport block and encoding the code block again, and then selects to-be-retransmitted encoded bits of the encoded code block from the circular buffer based on a quantity of times of retransmissions and a redundancy version.

After demodulating and de-interleaving the received modulation symbols, the communications device 120 stores soft values of received encoded bit segments at corresponding locations in a soft information buffer (soft buffer).

The communications device 120 decodes the soft values in the soft information buffer to obtain code blocks of the information data. If a decoding error occurs, the communications device 120 transmits feedback information to the communications device 110, so that the communications device 110 performs a retransmission based on the feedback information.

If retransmissions are performed, the communications device 120 combines soft values of an encoded bit segment in each transmission and stores the combined soft values in the soft information buffer. The combination herein means that if encoded bits received in two transmissions are at a same location in the circular buffer, soft values of the encoded bits received in the two transmissions are combined. Then the communications device 120 decodes the combined soft value in the soft information buffer.

The communications device 110 may be a network device, such as a base station in a communications system, and correspondingly the communications device 120 may be a terminal. Or, the communications device 110 may be a terminal, and correspondingly the communications device 120 may be a network device such as a base station.

In this application, terms "network" and "system" may be interchangeably used, and meanings of which are conventionally understood.

A terminal is a device having communication functions, and may include a handheld device that has a wireless communication function, an in-vehicle device, a wearable device, a computing device, a processing device connected to a wireless modem, or the like. The terminal may have different names in different networks, for example, user equipment, mobile station, subscriber unit, station, cellular phone, personal digital assistant, wireless modem, wireless communications device, handheld device, laptop computer, cordless phone, and wireless local loop station. For ease of description, these devices are simply referred to as a terminal in this application.

The base station, which may also be referred to as a base station device, is a device that connects a terminal and a wireless network. Applicable base station devices include: a transmission reception point (TRP), a next generation NodeB (gNB), an evolved NodeB (eNB), a radio network controller (RNC), a NodeB (NB), a base station controller (BSC), a base transceiver station (BTS), a home eNodeB (for example, a home evolved NodeB or a home NodeB, HNB), a baseband unit (BBU), a Wi-Fi access point (AP), and the like. Alternatively, a base station in a certain network may have another name. This is not limited in the present application.

Figure 2:
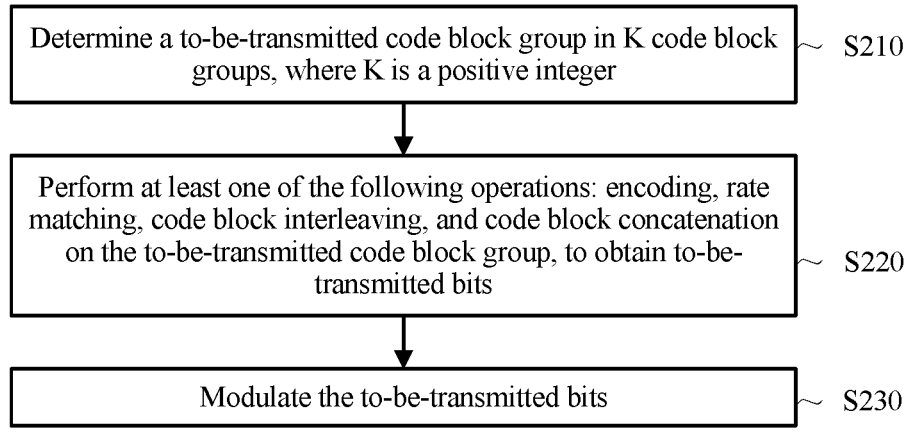
FIG. 2 is a flowchart of a data processing method according to an embodiment of this application.

FIG. 2 is a flowchart of a data processing method according to an embodiment of this application. The data processing method shown in FIG. 2 may be performed by a data processing apparatus. The data processing apparatus may be the communications device 110 in FIG. 1, or may be a part of the communications device 110. The data processing method includes the following steps.

S210. Determine one or more to-be-transmitted code block groups in K code block groups of a transport block, where K is a positive integer.

In other words, code block groups in a transport block that need to be transmitted to a receiving end are determined. In this case, the transport block is segmented into the K code block groups. Each code block group includes one or more code blocks of the transport block.

S220. Perform at least one of the following operations: encoding, rate matching, code block interleaving, and code block concatenation on each of the to-be-transmitted code block groups, to obtain to-be-transmitted bits.

S230. Modulate the to-be-transmitted bits.

Generally, the data processing apparatus may determine a quantity K of code block groups into which the transport block is segmented. If the transport block is segmented into C code blocks, the data processing apparatus determines to group the C code blocks into K code block groups, where C is a positive integer.

The quantity K of the code block groups may be configured by a system, or may be determined by a system.

For example, a fixed value may be specified in the system as the quantity K.

For another example, the system may determine the quantity K based on any one or more of the following: a length of the transport block, a maximum quantity of bits of acknowledgement information fed back by the receiving end, and a quantity of code block groups that is indicated by control signaling.

The maximum quantity of bits of the acknowledgement information fed back by the receiving end may be a maximum quantity of bits used to indicate receiving statuses of code block groups after the receiving end receives all or some code blocks in the transport block. The acknowledgement information that is fed back may be a hybrid automatic repeat request (HARQ) or the like.

The quantity of code block groups that is indicated by the control signaling may be a quantity of code block groups that can be obtained through segmentation and that is specified by the system by using system signaling.

For example, when K is determined based on the length of the transport block, the system may configure a relationship table, and the relationship table records a correspondence between a length or a length range of a transport block and a quantity of code block groups. Herein, the length of the transport block may be a quantity of bits included in the transport block. In this way, after determining a target transport block, the data processing apparatus may search the relationship table for a quantity of code block groups that corresponds to a length of the target transport block.

When K is determined based on only the maximum quantity of bits of the acknowledgement information fed back by the receiving end or the quantity of code block groups that is indicated by the control signaling, the maximum quantity of bits of the acknowledgement information fed back by the receiving end or the quantity of code block groups that is indicated by the control signaling may be determined as K.

When K is determined based on the maximum quantity of bits of the acknowledgement information fed back by the receiving end and the quantity of code block groups that is indicated by the control signaling, a minimum value in the maximum quantity of bits of the acknowledgement information fed back by the receiving end and the quantity of code block groups that is indicated by the control signaling may be determined as K.

When K is determined based on the maximum quantity of bits of the acknowledgement information fed back by the receiving end and the length of the transport block, a quantity of code block groups configured for the transport block with the length may be determined in the relationship table, and a minimum value in the quantity of code block groups configured for the transport block with the length and the maximum quantity of bits of the acknowledgement information fed back by the receiving end is determined as K.

When K is determined based on the quantity of code block groups that is indicated by the control signaling and the length of the transport block, a quantity of code block groups configured for the transport block with the length may be determined in the relationship table, and a minimum value in the quantity of code block groups configured for the transport block with the length and the quantity of code block groups that is indicated by the control signaling is determined as K.

When K is determined based on the maximum quantity of bits of the acknowledgement information fed back by the receiving end, the quantity of code block groups that is indicated by the control signaling, and the length of the transport block, a quantity of code block groups configured for the transport block with the length may be determined in the relationship table, and a minimum value in the quantity of code block groups configured for the transport block with the length, the maximum quantity of bits of the acknowledgement information fed back by the receiving end, and the quantity of code block groups that is indicated by the control signaling is determined as K.

The foregoing methods for determining the quantity of code block groups in the transport block are merely examples, and should not be construed as any limitation on this application.

After the quantity K of target code block groups corresponding to the transport block is determined, the transport block may be segmented into the K code block groups, and then to-be-transmitted code block groups in the K code block groups may be determined.

If the transport block is to be transmitted for initial transmission, the transport block may not be segmented into code block groups and there is no need to determine a to-be-transmitted code block group, and the entire transport block or the code blocks included in the transport block are directly transmitted. Alternatively, the transport block may be segmented into K code block groups, and the K code block groups are all to-be-transmitted code block groups.

If the transport block or some code blocks in the transport block are to be retransmitted, a to-be-retransmitted code block group in the K code block groups needs to be determined. Specifically, the data processing apparatus may receive indication information, and determine the to-be-retransmitted code block group in the K code block groups based on the indication information.

For example, a quantity of bits in the indication information that are used for feedback may be 10. Each bit may have two values: 0 and 1. When an $i^{th}$ bit in the ten bits is "1", it indicates that an $i^{th}$ code block group in ten code block groups is a to-be-retransmitted code block group; or when an $i^{th}$ bit is "0", it indicates that an $i^{th}$ code block group is not a to-be-retransmitted code block group.

In this case, when bit information included in the indication information is "0000100000", the data processing apparatus may determine, based on that a fifth bit in the ten bits is "1", that a fifth code block group is a to-be-retransmitted code block group in the ten code block groups.

Certainly, the indication information may be used to indicate a plurality of to-be-retransmitted code block groups. For example, values of a plurality of bits in the indication information are 1.

The operation of determining a to-be-retransmitted code block group may be performed at any phase after a transmitting end determines the transport block and before the transmitting end transmits symbols obtained through modulation. Certainly, it is expected to perform the operation of determining a to-be-retransmitted code block group as earlier as possible. If the to-be-retransmitted code block group is determined earlier, a code block group other than the to-be-retransmitted code block group in the transport block can be discarded earlier. In other words, a code block other than a code block included in the to-be-retransmitted code block group in the transport block can be discarded earlier.

Herein, discarding the code block other than the code block included in the to-be-retransmitted code block group in the transport block may be understood as: performing no further processing on the code block group or code block other than the to-be-retransmitted code block group, and processing only the to-be-retransmitted code block group; or processing only a code block belonging to the to-be-retransmitted code block group; or ignoring the code block group or code block other than the to-be-retransmitted code block group in the transport block; or performing no subsequent processing on the code block group or code block other than the to-be-retransmitted code block group in the transport block. In other words, the processing of the code block group or code block other than the to-be-retransmitted code block group has no output, or a quantity of output bits of the code block group or code block other than the to-be-retransmitted code block group is zero, thereby providing a feasible method for saving resources of the data processing apparatus. The processing herein may be one or more of the following operations: encoding, rate matching, code block interleaving, and code block concatenation. It should be noted that the code block concatenation described in this specification may also be referred to as code block combination in some cases.

For example, if one or more to-be-retransmitted code block groups are determined before encoding, encoding and operations after the encoding such as rate matching, interleaving, and code block concatenation may not be performed on the code block groups other than the one or more to-be-retransmitted code block groups, but may be performed on only the one or more to-be-retransmitted code block groups, thereby saving resources of the data processing apparatus.

For another example, if the one or more to-be-retransmitted code block groups are determined after encoding and before rate matching, encoding and operations before the encoding may be performed on all code block groups, but operations after the encoding such as rate matching, interleaving, and code block concatenation may be performed on only the one or more to-be-retransmitted code block groups, thereby saving resources of the data processing apparatus. In this implementation, after the encoding, when a code block group or code block in the transport block is determined as a not-to-be-retransmitted code block group or a code block in a not-to-be-retransmitted code block group, subsequent operations are not performed on the code block group or code block in the transport block. For example, information about the code block group or code block is not included in rate matching output, or rate matching of the code block group or code block has no output, or a quantity of rate matching output bits of the code block group or code block is zero. For still another example, if the to-be-retransmitted code block group is determined after rate matching and before code block concatenation, rate matching and an operation before the rate matching such as encoding may be performed on all code block groups, but operations after the rate matching such as interleaving and code block concatenation may be performed on only the to-be-retransmitted code block group, thereby saving resources of the data processing apparatus.

The at least one code block may be a code block obtained by segmenting the transport block, or may be a code block obtained after the encoding, or may be a bit segment obtained after rate matching is performed on the code block, or may be a code block obtained through intra-code block interleaving. Certainly, the at least one code block may alternatively be a code block obtained through another operation. This is not limited in this embodiment of this application.

Optionally, before determining the to-be-retransmitted code block group, the data processing apparatus may obtain the indication information that indicates the to-be-retransmitted code block group, and then determine the to-be-retransmitted code block group based on the indication information.

Specifically, the indication information may be configured by the system, or may be received from the receiving end of the transport block.

Specifically, the indication information may be used to indicate an index or identification information of the to-be-retransmitted code block group in the K code block groups. Alternatively, the indication information may be used to notify, in an indicator-blinking manner, the data processing apparatus of which code block group is a to-be-retransmitted code block group.

For example, a quantity of bits in the indication information that are used for feedback may be 10. Each bit may have two values: 0 and 1. When an $i^{th}$ bit in the ten bits is "1", it indicates that an $i^{th}$ code block group in ten code block groups is a to-be-retransmitted code block group; or when an $i^{th}$ bit is "0", it indicates that an $i^{th}$ code block group is not a to-be-retransmitted code block group.

In this case, when bit information included in the indication information is "0000100000", it indicates that a fifth code block group is a to-be-retransmitted code block group in the ten code block groups.

Certainly, the indication information may be used to indicate a plurality of to-be-retransmitted code block groups. For example, values of a plurality of bits in the indication information may be 1.

After the to-be-retransmitted code block group is determined, a subsequent operation may be performed on the to-be-retransmitted code block group.

For example, if the to-be-retransmitted code block group is determined before encoding, encoding and an operation after the encoding such as rate matching, code block concatenation, or symbol modulation, etc. may be performed on the to-be-retransmitted code block group herein.

If the to-be-retransmitted code block group is determined after encoding and before rate matching, rate matching and subsequent operations such as interleaving and code block concatenation, etc. may be performed on the to-be-transmitted code block group herein.

If the to-be-retransmitted code block group is determined after rate matching and before code block interleaving, interleaving and subsequent operations such as code block concatenation, etc. may be performed on the to-be-transmitted code block group herein.

If the to-be-retransmitted code block group is determined before code block concatenation, code block concatenation and subsequent operations such as modulation, etc. may be performed on the to-be-retransmitted code block group herein.

It should be understood that the performing at least one of the following operations: encoding, rate matching, code block interleaving, and code block concatenation on the to-be-retransmitted code block group may include: performing at least one of the following operations: encoding, rate matching, code block interleaving, and code block concatenation on only the to-be-retransmitted code block group. This data processing method can save resources of the data processing apparatus.

As described herein, the performing at least one of the following: encoding, rate matching, code block interleaving, and code block concatenation on the code block belonging to the to-be-retransmitted code block group may be understood as performing at least one of the following: encoding, rate matching, code block interleaving, and code block concatenation on only the code block belonging to the to-be-retransmitted code block group.

An implementation of performing at least one of the following: encoding, rate matching, code block interleaving, and code block concatenation on only the code block belonging to the to-be-retransmitted code block group is as follows: The data processing apparatus traverses all the code blocks, and determines, when traversing each code block, whether the code block belongs to a to-be-retransmitted code block group; and if the code block belongs to the to-be-retransmitted code block group, the data processing apparatus performs at least one of the following: encoding, rate matching, code block interleaving, and code block concatenation; if the code block does not belong to the to-be-retransmitted code block group, traverses a next code block.

Modulation symbols may be obtained after the to-be-transmitted bits are modulated, and then these modulation symbols may be transmitted.

It should be understood that the transmitting herein is transmitting in a broad sense. If the operation performed on the to-be-transmitted code block group in S220 includes encoding, the transmitting herein may include all operations performed to enable the receiving end to receive bits obtained after the to-be-transmitted code block group is encoded. For another example, if the operation performed on the to-be-transmitted code block group in S220 includes rate matching, the transmitting herein may include all operations performed to enable the receiving end to receive bits obtained after rate matching is performed on the to-be-transmitted code block group.

Figure 3:
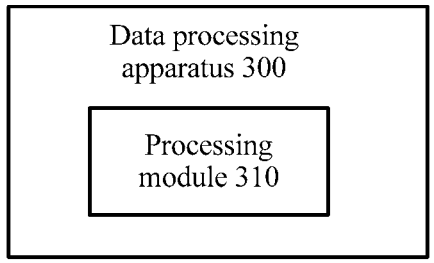
FIG. 3 is a block diagram of a data processing apparatus according to an embodiment of this application.

FIG. 3 is a block diagram of a data processing apparatus according to an embodiment of this application. It should be understood that the data processing apparatus 300 shown in FIG. 3 is merely an example. The data processing apparatus in this embodiment of this application may further include other modules or units.

A processing module 310 is configured to determine a to-be-transmitted code block group in K code block groups, where the to-be-transmitted code block group includes at least one code block.

The processing module 310 is further configured to perform at least one of the following: encoding, rate matching, code block interleaving, and code block concatenation on the to-be-transmitted code block group, to obtain to-be-transmitted bits.

The processing module 310 is further configured to modulate the to-be-transmitted bits.

The data processing apparatus determines the to-be-transmitted code block group in the K code block groups before the encoding, rate matching, interleaving, or code block concatenation, so that an operation after the encoding, rate matching, interleaving, or code block concatenation can be performed on only the to-be-transmitted code block group or the code block included in the to-be-transmitted code block group, but not on a code block group other than the to-be-transmitted code block group in the K code block groups, thereby helping save resources and improving transmission efficiency.

Optionally, the processing module 310 may be further configured to obtain indication information, where the indication information is used to indicate the to-be-transmitted code block group in the K code block groups. When determining the to-be-transmitted code block group in the K code block groups, the processing module 310 may be specifically configured to determine the to-be-transmitted code block group in the K code block groups based on the indication information.

Optionally, the processing module 310 may be further configured to: determine a quantity K of target code block groups in a transport block, where K is a positive integer; and segment the transport block into the K code block groups.

Optionally, when determining K for the transport block, the processing module 310 may be specifically configured to determine K based on at least one of the following information: a length of the transport block, a maximum quantity of bits of acknowledgement information fed back by a receiving end, and a quantity of code block groups that is indicated by control signaling.

Optionally, the processing module 310 is specifically configured to determine a minimum value in a quantity of code block groups configured for the transport block with the length and the maximum quantity of bits as K.

Optionally, the processing module 310 is specifically configured to determine, as K, a minimum value in a quantity of code block groups configured for the transport block with the length and the quantity of code block groups that is indicated by the control signaling.

Optionally, the processing module 310 is specifically configured to determine a minimum value in the quantity of code block groups that is indicated by the control signaling and the maximum quantity of bits as K.

Optionally, the processing module 310 is specifically configured to determine, as K, a minimum value in a quantity of code block groups configured for the transport block with the length, the maximum quantity of bits of the acknowledgement information fed back by the receiving end, and the quantity of code block groups that is indicated by the control signaling.

The data processing apparatus shown in FIG. 3 may perform the steps in the data processing method shown in FIG. 2. For brevity, details are not described herein again.

Figure 4:
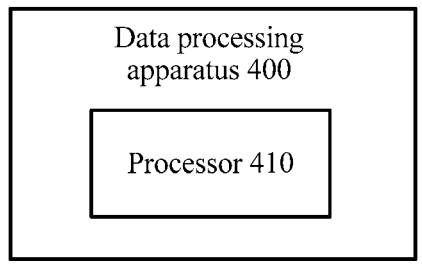
FIG. 4 is a block diagram of a data processing apparatus according to another embodiment of this application.

FIG. 4 is a block diagram of a data processing apparatus according to another embodiment of this application. The data processing apparatus 400 includes one or more processors 410.

The processor 410 is configured to implement the operations or steps that can be implemented by the processing module 310 in FIG. 3.

The data processing apparatus shown in FIG. 4 may further include: a receiver and a transmitter. The receiver is configured to receive information transmitted by another device, and the transmitter is configured to transmit information to another device. The receiver and the transmitter may be integrated into a transceiver.

The data processing apparatus shown in FIG. 4 may also include one or more memories, configured to store program code executed by the processor. The processor 410 may be integrated with a memory, or the processor 410 is coupled to the one or more memories, and is configured to invoke an instruction in the memory to perform the steps described in the foregoing method embodiment.

In combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Different methods may be used to implement the described functions for each particular application, but it should not be considered that the implementation goes beyond the scope of this application.

For the purpose of convenient and brief description, for a detailed working process of the foregoing system, apparatus, and unit, refer to a corresponding process in the foregoing method embodiments. Details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments of this application may be integrated into one processing module, or each of the units may exist alone physically, or two or more units are integrated into one unit.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
receiving, by a data processing apparatus, indication information;
determining, by the data processing apparatus, a code block group corresponding to a bit "1" in the received indication information as a to-be-transmitted code block group in K code block groups, wherein a transport block is segmented into C code blocks, and the C code blocks are grouped into the K code block groups, C and K are both positive integers, and wherein the received indication information comprises K bits, each of the K bits is either "1" or "0" and corresponds to one of the K code block groups, respectively;
in response to a first code block of the C code blocks belonging to the to-be-transmitted code block group, processing, by the data processing apparatus, the first code block during transmission of the transport block to obtain a bit sequence, and in response to a second code block of the C code blocks not belonging to the to-be-transmitted code block group, skipping processing, by the data processing apparatus, the second code block during transmission of the transport block; and
outputting, by the data processing apparatus, the bit sequence;
wherein the processing a given code block of the C code blocks during transmission of the transport block comprises:
performing rate matching on a coded block corresponding to the given code block, wherein the coded block is obtained after encoding the given code block, and the coded block comprises bits from the given code block and check bits; or
encoding the given code block.

2. The method according to claim 1, wherein for an initial transmission of the transport block, the to-be-transmitted code block group comprises the K code block groups.

3. The method according to claim 1, wherein the received indication information is received from a receiving end of the transport block.

4. The method according to claim 1, wherein the quantity K is determined based on one or more of the following information items:
a length of the transport block,
a maximum quantity of bits of acknowledgement information fed back by a receiving end of the transport block, or
a quantity of code block groups that is indicated by control signaling.

5. The method according to claim 1, further comprising:
performing at least one of: rate matching, interleaving, code block concatenation, or modulating operations on the bit sequences, to obtain to-be-transmitted bit sequences.

6. The method according to claim 1, wherein for a retransmission of the transport block, the to-be-transmitted code block group comprises one or more code block groups of the K code block groups.

7. The method according to claim 1, wherein:
after skipping processing the second code block of the C code blocks, a quantity of bits of an output of skipping processing of the second code block is zero.

8. An apparatus comprising:
first circuitry, configured to receive indication information;
second circuitry, configured to determine a code block group corresponding to a bit "1" in the received indication information as a to-be-transmitted code block group in K code block groups, wherein a transport block is segmented into C code blocks, and the C code blocks are grouped into the K code block groups, C and K are both positive integers, and wherein the received indication information comprises K bits, each of the K bits is either "1" or "0" and corresponds to one of the K code block groups, respectively;
third circuitry, configured to, in response to a first code block of the C code blocks belonging to the to-be-transmitted code block group, process the first code block during transmission of the transport block to obtain a bit sequence, and in response to a second code block of the C code blocks not belonging to the to-be-transmitted code block group, skip processing the second code block during transmission of the transport block; and
fourth circuitry, configured to output the bit sequence;
wherein the processing a given code block of the C code blocks during transmission of the transport block comprises:
performing rate matching on a coded block corresponding to the given code block, wherein the coded block is obtained after encoding the given code block, and the coded block comprises bits from the given code block and check bits; or
encoding the given code block.

9. The apparatus according to claim 8, wherein for an initial transmission of the transport block, the to-be-transmitted code block group comprises the K code block groups.

10. The apparatus according to claim 8, wherein the received indication information is received from a receiving end of the transport block.

11. The apparatus according to claim 8, wherein the quantity K is determined based on one or more of the following information items:
a length of the transport block,
a maximum quantity of bits of acknowledgement information fed back by a receiving end of the transport block, or
a quantity of code block groups that is indicated by control signaling.

12. The apparatus according to claim 8, wherein the third circuitry is further configured to:
perform at least one of: rate matching, interleaving, code block concatenation, or modulating operations on the bit sequences, to obtain to-be-transmitted bit sequences.

13. The apparatus according to claim 8, wherein the apparatus is a terminal or a network device.

14. The apparatus according to claim 8, wherein for a retransmission of the transport block, the to-be-transmitted code block group comprises one or more code block groups of the K code block groups.

15. The apparatus according to claim 8, wherein:
after skipping processing the second code block of the C code blocks, a quantity of bits of an output of skipping processing of the second code block is zero.

16. A non-transitory computer readable storage medium, storing programming that, when executed by a processor, causes an apparatus to:

receive indication information;

determine a code block group corresponding to a bit "1" in the received indication information as a to-be-transmitted code block group in K code block groups, wherein a transport block is segmented into C code blocks, and the C code blocks are grouped into the K code block groups, C and K are both positive integers, and wherein the received indication information comprises K bits, each of the K bits is either "1" or "0" and corresponds to one of the K code block groups, respectively;

in response to a first code block of the C code blocks belonging to the to-be-transmitted code block group, process the first code block during transmission of the transport block to obtain a bit sequence, and in response to a second code block of the C code blocks not belonging to the to-be-transmitted code block group, skip processing the second code block during transmission of the transport block; and output the bit sequence;

wherein the processing a given code block of the C code blocks during transmission of the transport block comprises:

performing rate matching on a coded block corresponding to the given code block, wherein the coded block is obtained after encoding the given code block, and the coded block comprises bits from the given code block and check bits; or encoding the given code block.

17. The non-transitory computer readable storage medium according to claim 16, wherein for an initial transmission of the transport block, the to-be-transmitted code block group comprises the K code block groups.

18. The non-transitory computer readable storage medium according to claim 16, wherein the received indication information is received from a receiving end of the transport block.

19. The non-transitory computer readable storage medium according to claim 16, wherein the programming when executed by the processor, further causes the apparatus to:

perform at least one of: rate matching, interleaving, code block concatenation, or modulating operations on the bit sequences, to obtain to-be-transmitted bit sequences.

20. The non-transitory computer readable storage medium according to claim 16, wherein for a retransmission of the transport block, the to-be-transmitted code block group comprises one or more code block groups of the K code block groups.

* * * * *